(12) United States Patent
Liu et al.

(10) Patent No.: US 12,282,745 B2
(45) Date of Patent: Apr. 22, 2025

(54) INTELLIGENT QUESTION ANSWERING METHOD, APPARATUS, AND DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventors: Xiaoxue Liu, Shenzhen (CN); Yuyao Tang, Shenzhen (CN); Ninghua Wang, Shenzhen (CN); He Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 520 days.

(21) Appl. No.: 17/693,896

(22) Filed: Mar. 14, 2022

(65) Prior Publication Data
US 2022/0198154 A1 Jun. 23, 2022

Related U.S. Application Data

(63) Continuation of application No. PCT/CN2021/077515, filed on Feb. 23, 2021.

(30) Foreign Application Priority Data

Apr. 3, 2020 (CN) .......................... 202010261104.3

(51) Int. Cl.
*G06F 40/56* (2020.01)
(52) U.S. Cl.
CPC ..................... *G06F 40/56* (2020.01)
(58) Field of Classification Search
CPC .......... G06F 40/30; G06F 40/35; G06F 40/56; G06F 16/3329; G06F 16/367;
(Continued)

(56) References Cited

U.S. PATENT DOCUMENTS 7,668,716 B2 * 2/2010 Helbing .............. G10L 15/1822
704/235
10,242,049 B2 * 3/2019 Ma ....................... G06F 16/3329
(Continued)

FOREIGN PATENT DOCUMENTS

CN 102117467 A 7/2011
CN 106663130 A 5/2017
(Continued)

OTHER PUBLICATIONS

The State Intellectual Property Office of the People's Republic of China (SIPO) Office Action 1 for for 202010261104.3 May 22, 2020 16 Pages (including translation).
(Continued)

*Primary Examiner* — Abdelali Serrou
(74) *Attorney, Agent, or Firm* — ANOVA LAW GROUP, PLLC

(57) ABSTRACT

An intelligent question answering method includes: determining, based on received question information, a target object and a target attribute corresponding to the question information; obtaining an answer knowledge path and an external knowledge path of the target object other than the answer knowledge path from a pre-established knowledge graph based on the target object and the target attribute, the answer knowledge path including target context information for describing the target attribute, and the external knowledge path including external context information for describing another attribute; inputting the answer knowledge path and the external knowledge path into a trained neural network model to obtain a reply text, a training corpus of the neural network model during training including at least comment information of the target object; and outputting the reply text.

18 Claims, 10 Drawing Sheets

(58) Field of Classification Search

CPC .. G06F 16/953; G06F 18/214; G06F 16/3344; G06F 16/24522; G06F 16/2465; G06F 18/22; G06F 40/216; G06F 16/2272; G06F 16/2372; G06F 16/2468; G06F 16/3322; G06F 16/3334; G06F 16/35; G06F 16/84; G06F 16/334; G06F 16/9024; G06F 16/9535; G06F 40/279; G06F 40/284; G06F 40/295; G06F 16/00; G06F 16/24578; G06F 16/29; G06F 16/31; G06F 16/3331; G06F 16/3349; G06F 16/335; G06F 16/355; G06F 16/36; G06F 16/90332; G06F 16/95; G06F 16/951; G06F 3/167; G06F 40/166; G06F 40/205; G06F 40/242; G06F 16/2428; G06F 16/2452; G06F 16/24532; G06F 16/2455; G06F 16/2471; G06F 16/248; G06F 16/256; G06F 16/288; G06F 16/30; G06F 16/33; G06F 16/332; G06F 16/3325; G06F 16/3335; G06F 16/3347; G06F 16/338; G06F 16/90; G06F 16/901; G06F 16/9038; G06F 16/9537; G06F 18/217; G06F 18/23213; G06F 18/24; G06F 18/256; G06F 40/194; G06F 40/20; G06F 40/211; G06F 40/268; G06F 40/289

See application file for complete search history.

(56) References Cited

U.S. PATENT DOCUMENTS

| 10,733,619 | B1* | 8/2020 | Newman | G06F 40/253 |
|---|---|---|---|---|
| 11,182,381 | B2* | 11/2021 | Tunstall-Pedoe | G06F 16/24 |
| 2014/0280307 | A1 | 9/2014 | Gupta et al. | |
| 2019/0370337 | A1* | 12/2019 | Lee | G06F 40/30 |
| 2020/0004873 | A1 | 1/2020 | Chang et al. | |
| 2020/0193089 | A1 | 6/2020 | Huang et al. | |
| 2021/0042304 | A1* | 2/2021 | Lei | G06F 16/2465 |
| 2021/0319330 | A1* | 10/2021 | Nishida | G06F 16/30 |

FOREIGN PATENT DOCUMENTS

| CN | 109739995 A | 5/2019 |
|---|---|---|
| CN | 109815482 A | 5/2019 |
| CN | 109829039 A | 5/2019 |
| CN | 109934631 A | 6/2019 |
| CN | 110008322 A | 7/2019 |
| CN | 110263183 A | 9/2019 |
| CN | 110765253 A | 2/2020 |
| CN | 110807118 A | 2/2020 |
| CN | 111143540 A | 5/2020 |

OTHER PUBLICATIONS

The World Intellectual Property Organization (WIPO) International Search Report for PCT/CN2021/077515 May 19, 2021 7 Pages (including translation).

Cun Shen et al., "Knowledge graph question answering based on multi-granularity feature representation," Computers and Modernization, Issue 9, 2018. 6 pages.

Qi Wu et al. "Ask Me Anything: Free-Form Visual Question Answering based on Knowledge from External Sources," 2016 IEEE Conference on Computer Vision and Pattern Recognition (CVPR), 2016, pp. 4622-4630. 9 pages.

D. Bahdanau et al., "Neural machine translation by jointly learning to align and translate," arXiv preprint arXiv:1409.0473v1, Sep. 1, 2014. 15 pages.

R. Lian et al., "Learning to select knowledge for response generation in dialog systems," arXiv preprint arXiv:1902.04911v2, May 21, 2019. 7 pages.

D. P. Kingma et al., "Auto-encoding variational bayes," arXiv:1312.6114v1, Dec. 20, 2013. 9 pages.

T. Zhao et al., "Learning discourse-level diversity for neural dialog models using conditional variational autoencoders," arXiv preprint arXiv:1703.10960, 2017v3, Oct. 21, 2017. 11 pages.

* cited by examiner

601

| Impressions: | Overall good (345) | Nice style (213) | Dress beauty (206) | Beautiful style (100) |
| --- | --- | --- | --- | --- |
| | Nice color (88) | Very warm (85) | Good fabric (82) | Good workmanship (53) |

● All  ○ Pictures (204)  ○ Further reviews (74)  ○ Good reviews (5135)  ○ Medium reviews (6)  ○ Bad reviews (3)  | Recommend order ▼ | t***9 (anonymous)

The buyer is very good. The clothes are not suitable for me, and the buyer changed them in time. The clothes have been pushed to many classmates. The quality of the clothes is also very good. It is not very thick or bloated. I like this fabric. It feels very textured and I'm very satisfied. I am 112 catties and 158 cm. The s size is too big for me, which is because my skeleton is small, and xs is suitable for me December 24, 2019 10:54  Color Classification: Black + Black Anti-fur collar  Size: XS    Useful (0)

t***7

The quality of the clothes is beyond expectation</em>, the workmanship is exquisite. It's very high-end. What a pleasant shopping January 03, 2020 17:11  Color Classification: Haze Blue + White Anti-fur collar  Size: S    Useful (0)

l***w

It looks good, and the quality looks good!

December 29, 2019 09:47  Color Classification: Black + White Anti-fur collar  Size: M    Useful (0)

It is the popular haze blue this year~ The quality is super good, the style is relatively thin, but the sleeves are a little short for me. I'm 165, and the s size is a little below the knee he***qian December 24, 2019 10:29  Color Classification: Haze Blue + White Anti-fur collar  Size: S    Useful (0)

It's so beautiful! Especially the fluffy hat, which is very high-end and the most successful. I didn't report much hope, but it is so good!

t***ai    December 23, 2019 21:34  Color Classification: Beige + White Anti-fur collar  Size: XS    Useful (0)

This dress is not bad. The wiring is smooth and there is no extra thread. I bought it for my child. Hope she likes Mo***grass (anonymous) December 27, 2019 10:21  Color Classification: Haze Blue + White Anti-fur collar  Size: S    Useful (0)

FIG. 6

INTELLIGENT QUESTION ANSWERING METHOD, APPARATUS, AND DEVICE, AND COMPUTER-READABLE STORAGE MEDIUM

RELATED APPLICATION

This application is a continuation application of PCT Patent Application No. PCT/CN2021/077515 filed on Feb. 23, 2021, which claims priority to Chinese Patent Application No. 202010261104.3 filed on Apr. 3, 2020, all of which are incorporated herein by reference in entirety.

FIELD OF THE TECHNOLOGY

The present disclosure relates to the field of artificial intelligence (AI) technologies, and in particular, to an intelligent question answering method, apparatus, and device, and a computer-readable storage medium.

BACKGROUND

With the development of Internet technologies and smart terminals, people's work, life, and entertainment have experiences great changes. As far as shopping is concerned, more and more people have switched from physical store shopping to online shopping. When shopping online, users often have some questions about commodities that the users are interested in. With the development of e-commerce services, the number of online shopping orders increases sharply, and the costs of e-commerce customer service are also increasingly high, thereby greatly restricting the costs of e-commerce. Therefore, intelligent customer service systems are becoming more desirable.

In an intelligent customer service system, an intelligent customer service assistant first understands a question of a user, and then give an answer based on the question. With certain existing technologies, when answering questions of users, the intelligent customer service system often can only give cold and targeted answers, which cannot stimulate the users' desire to make purchases.

SUMMARY

Embodiments of the present disclosure provide an intelligent question answering method and apparatus, and a computer-readable storage medium, which can use posterior knowledge information such as comment information to polish and rewrite answers.

The technical solutions of the embodiments of the present disclosure are implemented as follows:

In one aspect, the present disclosure provides an intelligent question answering method, applied to an intelligent question answering device, the method including: determining, based on received question information, a target object and a target attribute corresponding to the question information; obtaining an answer knowledge path and an external knowledge path of the target object other than the answer knowledge path from a knowledge graph based on the target object and the target attribute, the answer knowledge path including target context information for describing the target attribute, and the external knowledge path including external context information for describing another attribute; inputting the answer knowledge path and the external knowledge path into a neural network model to obtain a reply text, a training corpus of the neural network model during training including at least comment information of the target object; and outputting the reply text.

In another aspect, the present disclosure provides an intelligent question answering apparatus, the apparatus including: a memory storing computer program instructions; and a processor coupled to the memory and configured to execute the computer program instructions and perform: determining, based on received question information, a target object and a target attribute corresponding to the question information; obtaining an answer knowledge path and an external knowledge path of the target object other than the answer knowledge path from a pre-established knowledge graph based on the target object and the target attribute, the answer knowledge path including target context information for describing the target attribute, and the external knowledge path including external context information for describing another attribute; inputting the answer knowledge path and the external knowledge path into a trained neural network model to obtain a reply text, a training corpus of the neural network model during training including at least comment information of the target object; and outputting the reply text.

In yet another aspect, the present disclosure provides a non-transitory computer-readable storage medium storing computer program instructions executable by at least one processor to perform: determining, based on received question information, a target object and a target attribute corresponding to the question information; obtaining an answer knowledge path and an external knowledge path of the target object other than the answer knowledge path from a knowledge graph based on the target object and the target attribute, the answer knowledge path including target context information for describing the target attribute, and the external knowledge path including external context information for describing another attribute; inputting the answer knowledge path and the external knowledge path into a neural network model to obtain a reply text, a training corpus of the neural network model during training including at least comment information of the target object; and outputting the reply text.

The embodiments of the present disclosure have the following beneficial effects:

In the intelligent question answering method provided in the embodiments of the present disclosure, after the question information is received, the target object and the target attribute are extracted. The answer knowledge path and the external knowledge path of the target object other than the answer knowledge path are obtained from the pre-established knowledge graph based on the target object and the target attribute. Since the answer knowledge path includes the target context information for describing the target attribute, and the external knowledge path includes the external context information for describing another attribute, answers can be enriched and polished through the context information and the external knowledge path. Finally, the answer knowledge path and the external knowledge path are inputted into the trained neural network model to obtain the reply text, and the reply text is outputted. The training corpus of the neural network model during training includes at least the comment information of the target object, so that the semantics of the reply text is close to the comment information, and the reply text is closer to shopping guide art of speaking, thereby stimulating the user's desire to make purchases.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

FIG. 6 is a schematic diagram of an interface of comment information according to certain embodiment(s) of the present disclosure.

DETAILED DESCRIPTION

Figure 1A:
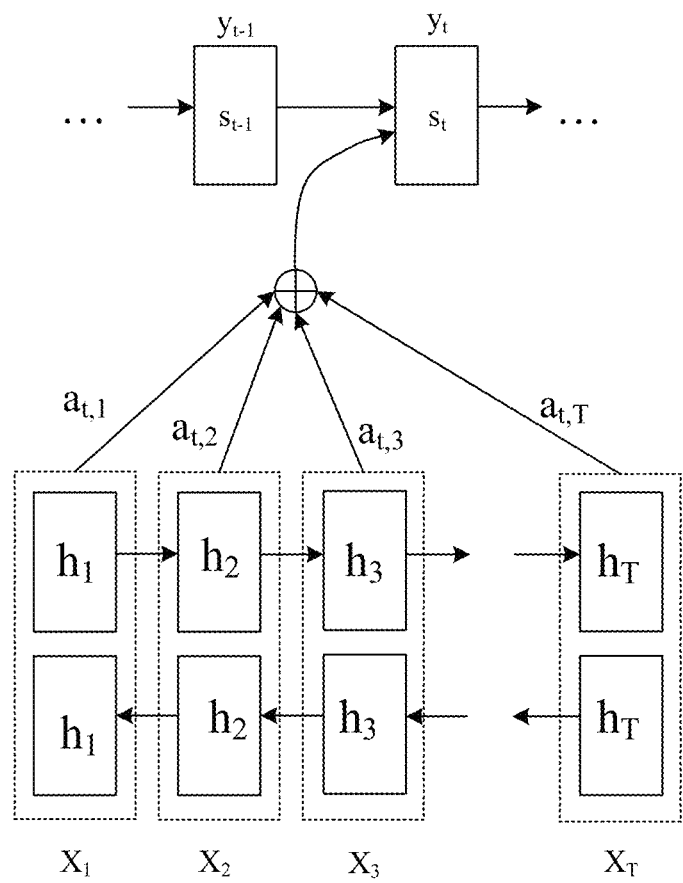
FIG. 1A is a schematic sequence-to-sequence model structure in the related art.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of the present disclosure described herein can be implemented in a sequence in addition to the sequence shown or described herein.

Unless otherwise defined, meanings of all technical and scientific terms used in the present disclosure are the same as those usually understood by a person skilled in the art to which the present disclosure belongs. Terms used in the present disclosure are merely intended to describe objectives of the embodiments of the present disclosure, but are not intended to limit the present disclosure.

Before the embodiments of the present disclosure are described in detail, a description is made on terms in the embodiments of the present disclosure, and the terms in the embodiments of the present disclosure are applicable to the following explanations.

1) E-commerce knowledge graph: It is a knowledge graph of vertical fields, which describes various commodities on an e-commerce platform, commodity attributes, and related attributes.

2) Shopping guide art of speaking: Shopping guide is a process of guiding customers to make purchases. The art of speaking is, namely, a skill of speaking. The shopping guide art of speaking is to answer, when consumers ask questions, the questions of the customers with more friendly and graceful words while reducing various doubts in consumers' hearts, and finally help the consumers to make purchases.

3) Encoder: It may also be referred to as an encoding model or an encoder model. An encoding module in a sequence-to-sequence generation model inputs a natural language sentence, and the encoding module generates a representation vector of the sentence. The encoder may be a recurrent neural network (RNN) model.

4) Decoder: It may also be referred to as a decoding model or a decoder model, or may be an RNN model. The decoding model may be a variety of RNNs with control/memory, for example, an RNN based on a long short-term memory (LSTM) network, a transformer model, or an RNN based on a gate recurrent unit (GRU). The decoding model may generate a sentence word by word according to a vector in a representation space.

5) Knowledge graph: It is a form of structured representation of knowledge, where a knowledge base is generally formed in the form of triples.

6) Answer path: An attribute of a commodity and an attribute value constitute an answer path.

7) Context information: It is a description of an attribute value. For example, a "color" attribute value of a dress is "red", and "red" has sub-picture description information, for example, "auspicious color, and festive color", and represents "enthusiasm". This descriptive information is referred to as context information of a graph answer path.

8) Knowledge based question answer (KB-QA): Given a natural language question, through semantic understanding and analysis of the question, a knowledge base is used for query and reasoning to obtain an answer.

9) Loss function: It is also referred to as a cost function, which is a function that maps a value of a random event or a related random variable thereof to a non-negative real number to express the "risk" or "loss" of the random event. During applications, the loss function is generally used as a learning criterion, and is related to an optimization problem. That is, the model is solved and evaluated by minimizing the loss function. For example, the loss function is used for parameter estimation of a model in statistics and machine learning (ML), and is an optimization goal of an ML model.

10) Attention mechanism: It is a mechanism that enables a neural network to be equipped with a capability of focusing on an input (or a feature) subset thereof: selecting a specific input. The core goal of the attention mechanism is to select information that is more critical to a current task goal from a plurality of pieces of information.

11) Word vector: It is also referred to as a word embedding or word space embedding representation. A word vector is a representation of a natural language word in a word space, which refers to a vector obtained by mapping a word to a semantic space.

To better understand the embodiments of the present disclosure, an intelligent question answering method in the related art and the existing disadvantages are first described.

The current intelligent question answering solutions include the following three types: a template-based generation method, an end-to-end sequence generation method (Seq2Seq), and a posterior knowledge selection (PostKs) method incorporating answer selection and generation of external knowledge. The three technical solutions are described below:

First, the template-based intelligent question answering method is described below.

A conventional question answering system based on a knowledge graph first finds a correct answer path from a subgraph of the knowledge graph through a deep learning (DL) model, obtains content of an answer, and then generates a more fluent and natural sentence by using a method of manually writing rules in a manner of slot replacement.

For example, if a user asks the price of a commodity: "How much is this?", the system first queries an e-commerce knowledge graph to find that the user is asking for the price in commodity attributes, and the price of the commodity is 100 yuan, so that a result is obtained: "Price: 100 yuan". An answer generation template is queried: "This one sells for ${price}.", the price is replaced with the attribute value of 100 yuan, and then the answer is returned to the user: "This one sells for 100 yuan."

This technical solution calls for manual writing of templates during implementation, which is time-consuming and labor-intensive. In addition, the writing staff may have a shopping guide background; otherwise, written templates are relatively simple and plain, which cannot stimulate the user's desire to make purchases.

Second, the intelligent question answering method of Seq2Seq is described below.

With the successful application of sequence-to-sequence model with attention mechanism in the field of machine translation, Seq2Seq has become the most popular depth generation model. FIG. 1A shows a sequence-to-sequence model structure in the related art. As shown in FIG. 1A, during implementation of this technical solution, no additional external knowledge is added, and only one sequence generates another sequence.

In a customer service dialog scenario, an input X of the model represents an answer obtained from the knowledge graph. After an encoder, an answer sequence representation shown in formula (1-1) may be obtained:

$$h_t = f_{encode}(x_t, h_{t-1}), \quad (1\text{-}1)$$

where $X_1$ to $X_T$ in FIG. 1A are representation vectors of words in an answer text, $X_1$ to $X_T$ are spliced to obtain an input vector $X_t$ at a moment t, $h_1$ to $h_T$ are respectively answer sequence representations corresponding to $X_1$ to $X_T$ at the moment t, $a_{t,1}$ to $a_{t,T}$ respectively represent weights of $h_1$ to $h_T$ at the moment t, $h_t$ represents an answer sequence representation at the moment t, $h_{t-1}$ represents an answer sequence representation at a moment (t−1), and $f_{encode}(\ )$ represents an encoding function.

In the decoding stage, when predicting a word $y_t$ that is to be generated at a next moment, in addition to considering a hidden layer representation at a previous moment and a predicted word at the previous moment, a context representation shown in formula (1-2) from a source end sequence is further considered:

$$c_t = \sum_{j=1}^{T} \frac{\exp(e_{tj})}{\sum_{k=1}^{T} \exp(e_{tk})} * h_j, \quad (1\text{-}2)$$

where $e_{tj}=a(s_{t-1},h_j)$.

The context representation constraints that the current word that is to be generated may have a relationship with the source end, which jointly determine a current hidden layer representation $S_t$ as shown in formula (1-3):

$$s_t = f_{decode}(s_{t-1}, y_{t-1}, c_t), \quad (1\text{-}3)$$

where $S_{t-1}$ is a hidden layer representation at the moment (t−1), $y_{t-1}$ is a word to be generated at the moment (t−1), $C_t$ is a context representation at the moment t, and $f_{decode}(\ )$ is a decoding function.

Finally, as shown in formula (1-4), the word generated at the previous moment, and the hidden layer representation and the context representation at the current moment jointly determine a probability of a currently generated word $y_t$:

$$p(y_t) = g(y_{t-1}, s_t, c_t), \quad (1\text{-}4)$$

where a function g represents a layer of nonlinear function. After a softmax layer, a word with a highest probability is selected from a vocabulary as the word predicted at the current moment.

In the process of model training, a cross-entropy loss function such as formula (1-5) is generally used:

$$E = \sum_t (y_t, \hat{y}_t) = \sum_t -y_t \log \hat{y}_t, \quad (1\text{-}5)$$

where $y_t$ is the word that is to be outputted at the moment t, and $\hat{y}_t$ represents a predicted result.

In this implementation scheme, external knowledge is not fully utilized, and the generated sentence is relatively single.

Third, the intelligent question answering method based on PostKs is described below.

Figure 1B:
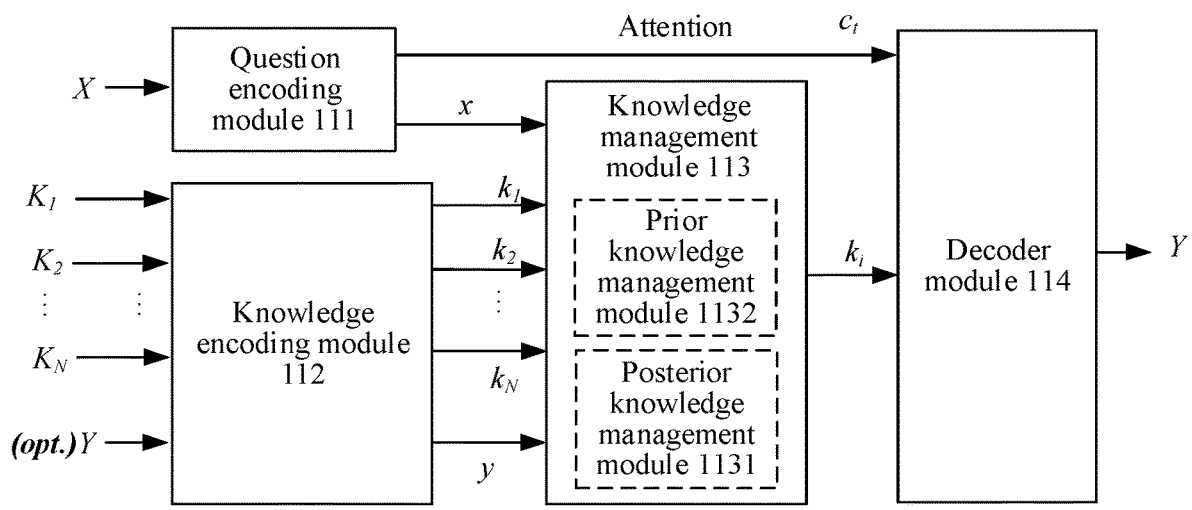
FIG. 1B is a schematic diagram of a framework of PostKS in the related art.

Although the sequence-to-sequence model is widely used in the field of dialog generation, sentences generated in this manner contain less information. Therefore, how to introduce external knowledge into the model to help the model learn more useful information has attracted more and more attention. PostKS is a method of selecting useful external knowledge based on posterior knowledge to generate answers. FIG. 1B is a schematic diagram of an overall framework of PostKS in the related art. As shown in FIG. 1B, the framework includes: a question encoding module 111, a knowledge encoding module 112, a knowledge management module 113 and a decoding module 114, where: the question encoding module 111 is configured to encode a question X of the user into a vector x; the knowledge encoding module 112 is configured to encode external knowledge $K_1$ to $K_N$ and a standard answer (opt.) Y to obtain $k_1$ to $k_N$ and y correspondingly; the knowledge management module 113 is configured to select a candidate answer $k_i$ closest to the standard answer from $k_1, k_2, \ldots, k_n$, and use the candidate answer in the decoding stage. The knowledge management module 113 is divided into two sub-modules, where one is a posterior knowledge management module 1131, and the other is a posterior knowledge management module 1132; and the decoding module 114 uses a context representation $c_t$ obtained by the attention mechanism of the input and the selected candidate knowledge $k_i$ as input to generate a reply Y.

Although external knowledge is used, only how to select the candidate answer from the external knowledge is resolved. In the e-commerce scenario, the use of graph context information to generate answers containing a plurality of relationships is not well developed, which is not well applied to shopping guide scenarios.

None of the three implementation schemes above constructs available e-commerce customer service question answering corpus; Moreover, the context information of the knowledge graph and the answer path information are not fully used to rewrite the answer, resulting in a cold and single generated answer. Only an answer is returned, and the speech is not beautiful and natural. For example, when a user asks about the price of a commodity, only the price is returned, without explaining advantages of the commodity, which cannot stimulate the user's desire to make purchases.

Based on this, the embodiments of the present disclosure provide an intelligent question answering method, in which training corpus of a model is constructed by extracting comments in an open e-commerce platform, answer paths and context information in a knowledge graph are used to use standard shopping guide replies as posterior knowledge, and the idea of variation is used to polish and rewrite answers based on a DL generation model, thereby generating answers with shopping guide art of speaking as replies, to stimulate consumers' desire to make purchases.

An exemplary application of an apparatus in an embodiment of the present disclosure is described below. The apparatus provided in this embodiment of the present disclosure may be implemented as a terminal device. An exemplary application that the apparatus includes a terminal device when being implemented as a terminal device is described below.

Figure 1C:
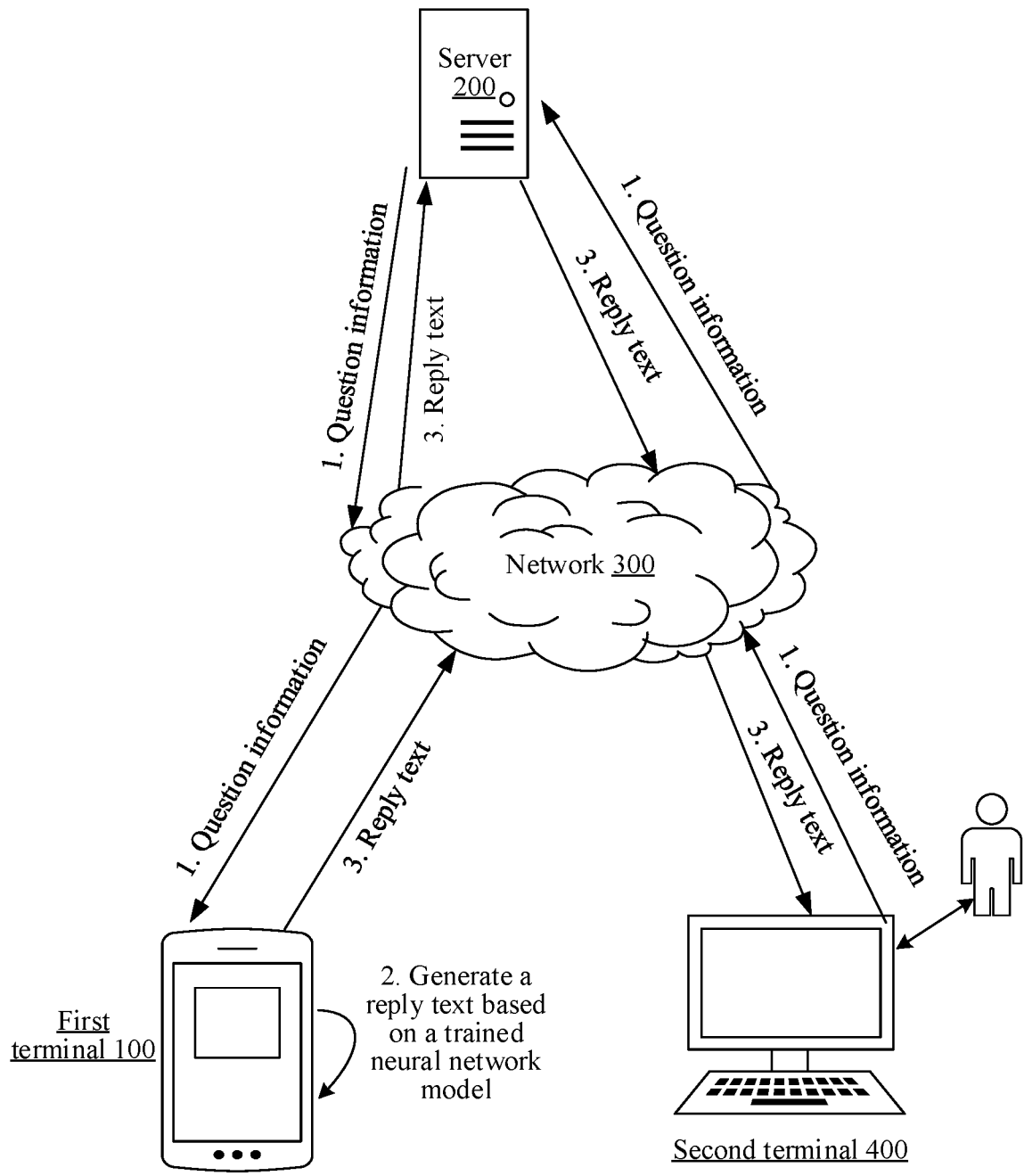
FIG. 1C is a schematic diagram of a network architecture of an intelligent question answering method according to certain embodiment(s) of the present disclosure.

FIG. 1C is a schematic diagram of a network architecture of an intelligent question answering method according to an embodiment of the present disclosure. As shown in FIG. 1C, the network architecture includes a first terminal 100, a server 200, a network 300, and a second terminal 400. To support an exemplary application, the first terminal 100 and the second terminal 400 are respectively connected to the server 200 through the network 300. The first terminal 100 may be a smart terminal, and an application (app) capable of dialog and chat may be installed on the smart terminal. The app may be an instant messaging app dedicated to dialog and chat, or a shopping app, video app, or the like that provide dialog and chat functions. The first terminal 100 may alternatively be an intelligent chat robot. An app capable of dialog and chat is also installed on the second terminal 400. The network 300 may be a wide area network, a local area network, or a combination of the wide area network and the local area network, and achieves data transmission by using a radio link.

The first terminal 100 may obtain dialog information sent by the second terminal 400 through the server 200, where the dialog information may be text information or voice information; use a neural network model trained to determine reply information corresponding to the dialog information; and send the reply information to the server 200. The server 200 then sends the reply information to the second terminal 400.

Figure 1D:
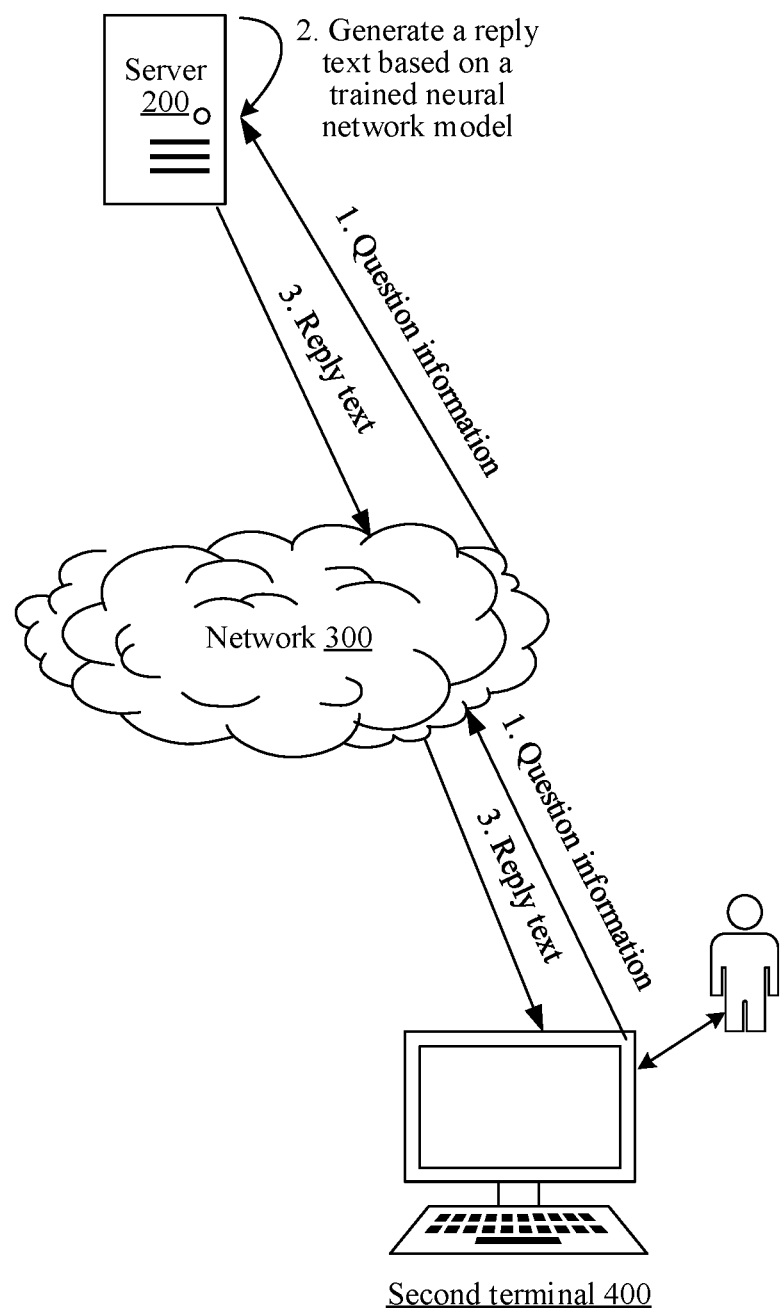
FIG. 1D is a schematic diagram of a network architecture of an intelligent question answering method according to certain embodiment(s) of the present disclosure.

FIG. 1D is a schematic diagram of another network architecture of an intelligent question answering method according to an embodiment of the present disclosure. As shown in FIG. 1D, the network architecture includes a server 200, a network 300, and a second terminal 400. The second terminal 400 may be a smartphone, a tablet computer, a notebook computer, or the like. The second terminal 400 sends the dialog information to the server 200. The server 200 uses a trained neural network model to determine reply information corresponding to the dialog information, and sends the reply information to the second terminal 400.

The server 200 may be an independent physical server, or may be a server cluster including a plurality of physical servers or a distributed system, or may be a cloud server providing cloud computing services, such as a cloud service, a cloud database, cloud computing, a cloud function, cloud storage, a network service, cloud communication, a middleware service, a domain name service, a security service, a content delivery network (CDN), big data, and an artificial intelligence (AI) platform.

In this embodiment of the present disclosure, during training of the neural network model, comments extracted from the e-commerce platform are used as training corpus, answer paths and context information in a knowledge graph are used to use standard shopping guide replies as posterior knowledge, and the idea of variation is used to polish and rewrite answers, thereby generating answers with shopping guide art of speaking as replies, to stimulate consumers' desire to make purchases.

The apparatus provided in this embodiment of the present disclosure may be implemented in a manner of hardware or a combination of hardware and software. The following describes various exemplary implementations of the apparatus provided in this embodiment of the present disclosure.

Figure 2:
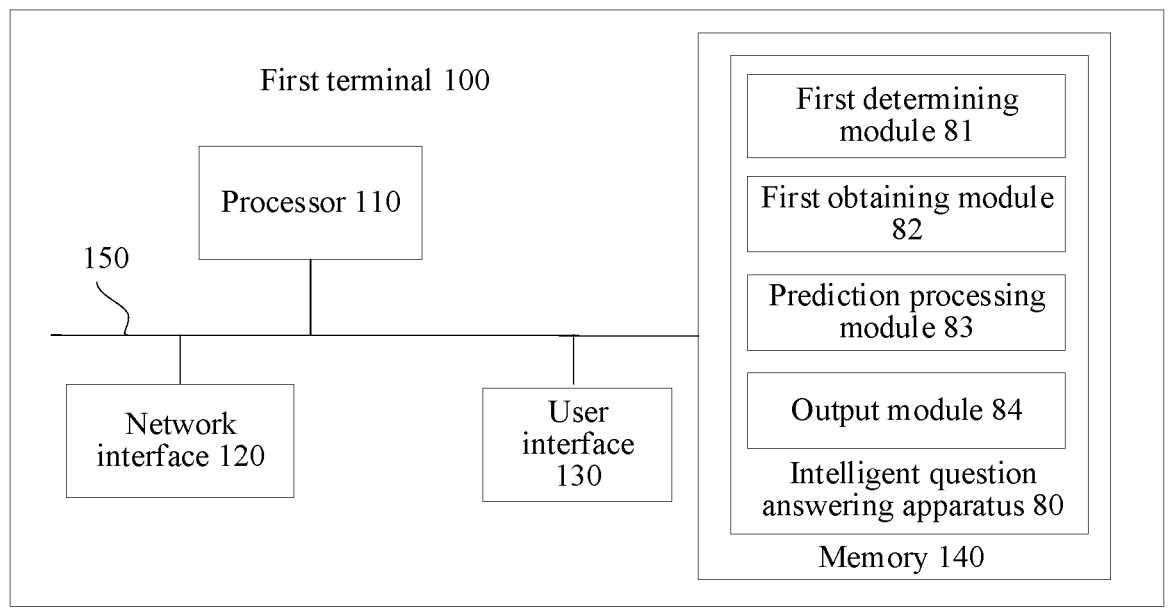
FIG. 2 is a schematic structural diagram of a first terminal 100 according to certain embodiment(s) of the present disclosure.

According to the exemplary structure of the first terminal 100 shown in FIG. 2, other exemplary structures of the first terminal 100 may be predicted. Therefore, the described structure is not to be considered restrictive, for example, a part of components described below may be omitted, alternatively, components not recorded in the following may be added.

The first terminal 100 shown in FIG. 2 includes at least one processor 110, a memory 140, at least one network interface 120, and a user interface 130. The components in the first terminal 100 are coupled together by a bus system 150. It may be understood that the bus system 150 is configured to implement connection and communication between the components. In addition to a data bus, the bus system 150 further includes a power bus, a control bus, and a status signal bus. However, for ease of clear description, all types of buses are labeled as the bus system 150 in FIG. 2.

The user interface 130 may include a display, a keyboard, a mouse, a touchpad, a touch screen, or the like.

The memory 140 may be a volatile memory or a non-volatile memory, or may include a volatile memory and a non-volatile memory. The non-volatile memory may be a read-only memory (ROM). The volatile memory may be a random access memory (RAM). The memory 140 described in this embodiment of the present disclosure is to include any other suitable type of memories.

The memory 140 in this embodiment of the present disclosure can store data to support operation of the first terminal 100. An example of the data includes any computer program to be operated on the first terminal 100, for example, an operating system and an application program. The operating system includes various system programs, such as framework layers, kernel library layers, and driver layers used for implementing various services and processing hardware-based tasks. The application program may include various application programs.

For example, the method provided in this embodiment of the present disclosure is implemented by software. The method provided in this embodiment of the present disclosure may be directly embodied as a combination of software modules executed by the processor 110. The software module may be located in a storage medium, the storage medium is located in the memory 140, and the processor 110 reads executable instructions included in the software module in the memory 140, and implements, in combination with desirable hardware (for example, including a processor 110 and another component connected to the bus 150), the method provided in the embodiments of the present disclosure.

For example, the processor 110 may be an integrated circuit chip, and has a signal processing capability, for example, a general-purpose processor, a digital signal processor (DSP), or another programmable logical device, a discrete gate or a transistor logical device, or a discrete hardware component. The general-purpose processor may be a microprocessor, any conventional processor, or the like.

The method provided in the embodiments of the present disclosure is described with reference to an exemplary application and implementation of the terminal provided in this embodiment of the present disclosure.

To better understand the method provided in the embodiments of the present disclosure, AI, various branches of AI, and the application fields involved in the method provided in the embodiments of the present disclosure are described first.

AI is a theory, method, technology, and application system that uses a digital computer or a machine controlled by the digital computer to simulate, extend, and expand human intelligence, perceive an environment, acquire knowledge, and use knowledge to obtain an optimal result. In other words, the AI is a comprehensive technology of computer science, which attempts to understand essence of intelligence and produces a new intelligent machine that can respond in a manner similar to human intelligence. The AI is to study the design principles and implementation methods of various intelligent machines, to enable the machines to have the functions of perception, reasoning, and decision-making.

The AI technology is a comprehensive discipline, covering a wide range of fields including both a hardware-level technology and a software-level technology. AI technologies generally include technologies such as sensors, dedicated AI chips, cloud computing, distributed storage, big data processing technologies, operating/interaction systems, and mechatronics. AI software technologies include several directions such as a computer vision technology, a speech processing technology, a natural language processing (NLP) technology, and ML/DL. The solutions provided in the embodiments of the present disclosure relate to the NLP technology of AI and the ML technology, which are respectively described below.

NLP is an important direction in the fields of computer science and AI. NLP studies various theories and methods for implementing effective communication between human and computers through natural languages. NLP is a science that integrates linguistics, computer science and mathematics. Therefore, studies in this field relate to natural languages, that is, languages used by people in daily life, and NLP is closely related to linguistic studies. NLP technologies usually include text processing, semantic understanding, machine translation, robot question answering, knowledge graphs and other technologies.

ML is a multi-disciplinary subject involving a plurality of disciplines such as probability theory, statistics, approximation theory, convex analysis, and algorithm complexity theory. ML specializes in studying how a computer simulates or implements a human learning behavior to acquire new knowledge or skills, and reorganize an existing knowledge structure, so as to keep improving its performance. ML is the core of AI, is a way to make the computer intelligent, and is applied to various fields of AI. ML and DL usually include technologies such as artificial neural network, belief network, reinforcement learning, transfer learning, and inductive learning.

Figure 3:
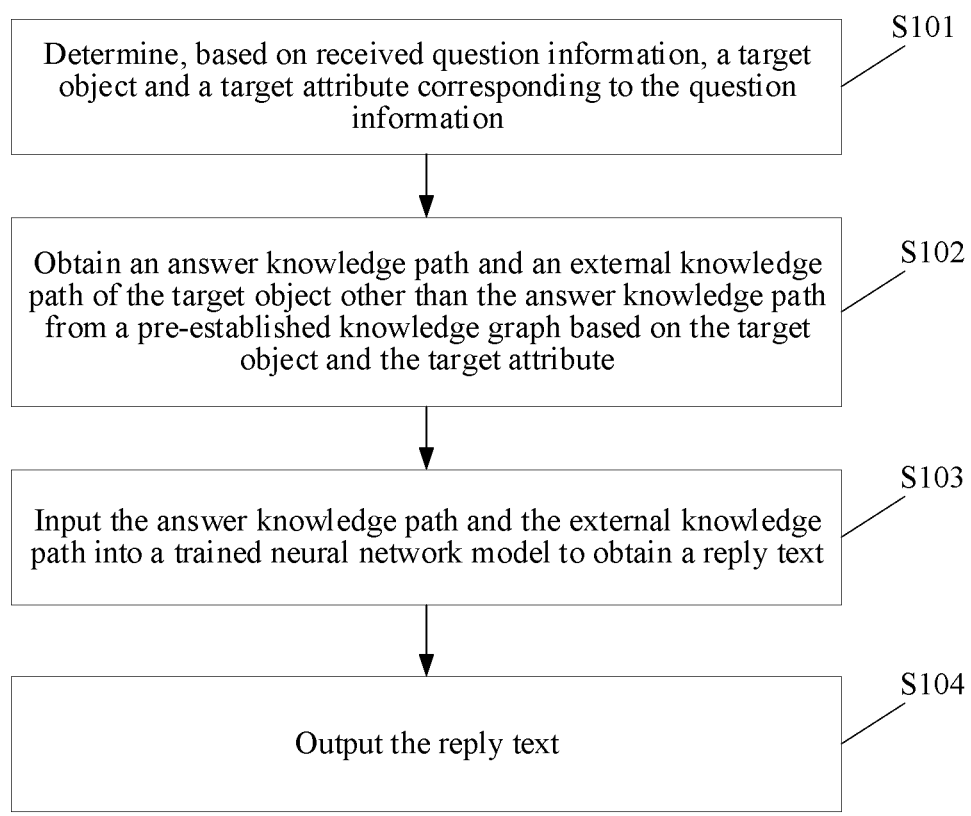
FIG. 3 is a schematic flowchart of an intelligent question answering method according to certain embodiment(s) of the present disclosure.

FIG. 3 is a schematic flowchart of an implementation of an intelligent question answering method according to an embodiment of the present disclosure. The method is applied to the first terminal shown in FIG. 1C or the server shown in FIG. 1D. In this embodiment of the present disclosure, an example is taken in which the intelligent question answering method is applied to the first terminal shown in FIG. 1C, and the description is made with reference to steps shown in FIG. 3.

Step S101: The first terminal determines, based on received question information, a target object and a target attribute corresponding to the question information.

The question information may be sent from the second terminal to the first terminal. The question information may be question information in a text form or a voice form. After the question information is received, the semantic understanding of the question information is carried out, and then the target object and target attribute corresponding to the question information are determined. Taking the field of e-commerce shopping as an example, the target object may be a standard of a commodity on sale, for example, may be clothes, shoes, or electronic products, and the target attribute may be price, material, size, or the like. In this embodiment of the present disclosure, taking the question information being "what is the down content of this down jacket?" as an example, it is determined that the target object is the down jacket, and the target attribute is the down content.

Step S102: The first terminal obtains an answer knowledge path and an external knowledge path of the target object other than the answer knowledge path from a pre-established knowledge graph based on the target object and the target attribute.

In certain embodiment(s), the term "pre-established knowledge graph" is interchangeable with the term "knowledge graph."

The answer knowledge path includes target context information for describing the target attribute, and the external knowledge path includes external context information for describing another attribute.

The pre-established knowledge graph may be a general knowledge graph in the e-commerce field. In this implementation, when step S102 is implemented, an answer path corresponding to the target object and the target attribute may be determined from the general knowledge graph first, where the answer path includes at least the target attribute and an attribute value of the target attribute. Some description information (context information) corresponding to the attribute value is then obtained according to the attribute value of the target attribute, to synthesize the answer path and the description information into the answer knowledge path, that is, the answer knowledge path includes not only the answer, but also the context information of the target attribute value.

Based on the example, an answer path obtained through the down jacket and the down content is down jacket-down content-white goose down 90%. To make the reply closer to the human customer service, description information of white goose down may be further obtained, for example, compared with white duck down, white goose down has better warmth retention. In addition, other attributes of the target object other than the target attribute may be determined. For example, the down jacket further includes other attributes such as color and material. Assuming that the attribute value of the color is red, and the attribute value of the material is high-density waterproof fabric, other knowledge paths include: color-red-enthusiasm, ebullience; and material-high-density waterproof fabric-waterproof, anti-drilling velvet.

In some embodiments, the pre-established knowledge graph may be obtained by expanding the general knowledge graph of the e-commerce field by using the context information of each attribute value of each object. In this implementation, when step S102 is implemented, according to the target object and the target attribute, the answer knowledge path may be directly obtained from the pre-established knowledge graph, and the external knowledge path is obtained.

Step S103: The first terminal inputs the answer knowledge path and the external knowledge path into a trained neural network model to obtain a reply text.

A training corpus of the neural network model during training includes at least comment information of the target object. Since the neural network model includes the comment information of the target object in the training corpus during training, the trained neural network model is then used to predict the answer knowledge path and the external knowledge path, thereby obtaining the reply text with semantics close to the comment information, and rewriting and polishing the answer.

Step S104: Output the reply text.

The outputting the reply text may be sending the reply text to the second terminal. After receiving the reply text, the second terminal may display the reply text on a display interface thereof.

In the intelligent question answering method provided in the embodiments of the present disclosure, after the question information is received, the target object and the target attribute are extracted. The answer knowledge path and the external knowledge path of the target object other than the answer knowledge path are obtained from the pre-established knowledge graph based on the target object and the target attribute. Since the answer knowledge path includes the target context information for describing the target attribute, and the external knowledge path includes the external context information for describing another attribute, answers can be enriched and polished through the context information and the external knowledge path. Finally, the answer knowledge path and the external knowledge path are inputted into the trained neural network model to obtain the reply text, and the reply text is outputted. The training corpus of the neural network model during training includes at least the comment information of the target object, so that the semantics of the reply text is close to the comment information, and the reply text is closer to shopping guide art of speaking, thereby stimulating the user's desire to make purchases.

In some embodiments, when the pre-established knowledge graph is the general knowledge graph in the e-commerce field, step S102 shown in FIG. 3 "The first terminal obtains an answer knowledge path and an external knowledge path of the target object other than the answer knowledge path from a pre-established knowledge graph based on the target object and the target attribute" may be implemented through the following steps S1021 to S1023, and the steps are described below.

Step S1021: Obtain an answer path and another path of the target object other than the answer path from the knowledge graph based on the target object and the target attribute.

The answer path includes at least the target attribute and a target attribute value, and the another path includes the another attribute of the target object and corresponding another attribute value. In this embodiment of the present disclosure, when the target object has a plurality of other attributes other than the target attribute, a plurality of other paths may be correspondingly obtained.

In this step, the answer path and the another path only include the attributes and the attribute values, and do not have description information of the attributes or the attribute values. Assuming that k is used to represent the attributes and v is used to represent the attribute values, the answer path may then be expressed as (k, v). For example, the target attribute is the down content, and the target attribute value is white goose down 90%, that is, k is the down content and v is the white goose down 90%. In this implementation, the answer path is (down content, white goose down 90%).

Step S1022: Obtain the target context information corresponding to the answer path, and determine the answer knowledge path based on the answer path and the target context information corresponding to the answer path.

When step S1022 is implemented, the target context information corresponding to the answer path may be obtained based on the target attribute value. In some embodiments, the target context information may be obtained from some general graphs, for example, may be obtained from a general map constructed based on encyclopedia knowledge. After the target context information is obtained, the target context information may be added to the answer path to obtain the answer knowledge path, that is, the difference between the answer knowledge path and the answer path is that the answer knowledge path includes context information. Assuming that d is used to represent context information, the knowledge path with the context information may be expressed as (k, v, d). Based on the example, the answer path is (down content, white goose down 90%), and the obtained target context information is that white goose down has better warmth retention than white duck down. Therefore, the answer knowledge path in this implementation is (down content, white goose down 90%, white goose down has better warmth retention than white duck down).

Step S1023: Obtain the external context information corresponding to the another path, and determine the external knowledge path based on the another path and the external context information corresponding to the another path.

Similar to the implementation process of step S1022, when step S1023 is implemented, external context information corresponding to other paths may be obtained based on various other attribute values. In addition, the external context information may also be obtained from some general graphs, for example, may be obtained from a general map constructed based on encyclopedia knowledge. After the external context information is obtained, the external context information may be added to other paths to obtain external knowledge paths. For example, if another attribute is color, a corresponding attribute value is red, and obtained external context information is enthusiasm and ebullience. In this implementation, the external knowledge path is (color, red, enthusiasm, ebullience).

Through the steps S1021 to S1023, the context information describing the attribute value may be obtained, so that the answer knowledge path and the external knowledge path include the description information in addition to the attributes and attribute values, to provide the corpus for polishing and rewriting the answer.

In some embodiments, before step S101, a trained neural network model may be obtained. In an actual implementation process, the training process of the neural network may be implemented through the following steps:

Step S001: Obtain training data.

The training data includes a training answer knowledge path, a training external knowledge path, and a standard reply text, and the standard reply text is extracted from the comment information of the target object. In this embodiment of the present disclosure, there may be a plurality of training external knowledge paths.

Step S002: Input the training answer knowledge path, the training external knowledge path, and the standard reply text into the neural network model to obtain a training reply text.

In step S002, in addition to inputting the training answer knowledge path into the neural network model, the training external knowledge path and the standard reply text are also inputted into the neural network model, thereby using the standard reply text to determine which training path or training paths are selected from the plurality of training external knowledge paths to supplement and rewrite the answer text corresponding to the training answer path, so that the training reply text can be close to the standard reply text.

Step S003: Perform back propagation training on the neural network model by using the standard reply text and the training reply text, to adjust a parameter of the neural network model.

When step S003 is implemented, a difference value between the standard reply text and the training reply text may be transmitted back to the neural network model, and the neural network model is jointly trained by using a first loss function, a second loss function, a third loss function, to adjust the parameter of the neural network model.

The first loss function is used to constrain a first conditional probability distribution to be close to a second conditional probability distribution. The first conditional probability distribution represents a probability distribution of the standard reply vector and the training answer knowledge vector on each training external knowledge vector, and the second conditional probability distribution represents a probability distribution of the training answer knowledge vector on each training external knowledge vector. The second loss function is used to constrain that the text corresponding to the answer path is included in the training reply text, and the third loss function is used to constrain the words obtained by decoding to obtain semantically correct sentences.

Through step S001 to step S003, the training data including the training answer knowledge path, the training external knowledge path, and the standard reply text may be used to train the neural network model, to obtain a trained neural network model that can rewrite the answer text corresponding to the answer knowledge path.

In some embodiments, a standard reply text corresponding to each attribute may be determined through the following steps:

Step S111: Obtain comment information of a target object, various attributes of the target object, and corresponding attribute values.

The comment information of the target object may be obtained from an e-commerce website, and the comment information of the target object may be obtained according to an identifier of the target object. In some embodiments, the comment information of the target object may alternatively be obtained from a plurality of different e-commerce web sites.

Step S112: Determine target comment information corresponding to each attribute from the comment information of the target object based on each attribute and/or the corresponding attribute value.

When step S112 is implemented, each attribute and/or each attribute value of the target object may be used as a keyword, one or more comment information that matches each attribute and/or each attribute value is determined from the comment information of the target object, and comment information with the most shopping guide art of speaking is determined from the one or more comment information as the target comment information. For example, when an attribute is color and a corresponding attribute value is red, comment information of the color (for example, "this color is very positive, and there is no color difference"), or comment information of red (for example, "the quality of the clothes is super good, and red is the popular color this year. It is cost-effective. Ha-ha, I love it") is obtained. Since the latter of the two pieces of comment information can better stimulate users' desire to make purchases, "the quality of the clothes is super good, and red is the popular color this year. It is cost-effective. Ha-ha, I love it") may be determined as the target comment information corresponding to the color.

Step S113: Pre-process the target comment information to obtain the standard reply text corresponding to the each attribute.

In certain embodiment(s), the term "pre-process the target comment information" is interchangeable with the term "process the target comment information."

When step S113 is implemented, processing such as English upper-lower case conversion and unification of traditional and simplified fonts may be performed on the target comment information, and some words in the target comment information that are weakly associated with attributes or attribute values may be further deleted. Based on the example, since "Ha-ha, I love it" in "the quality of the clothes is super good, and red is the popular color this year.

It is cost-effective. Ha-ha, I love it" has a weak correlation with the color. Therefore, after the target comment information is pre-processed, the standard reply text "it is the popular red this year, the quality of this clothes is super good, and it is cost-effective" corresponding to the color may be obtained.

In the embodiment of steps S111 to S113, the target comment information corresponding to each attribute with more shopping guide art of speaking may be extracted from the comment information, and the target comment information is pre-processed to obtain the standard reply text, to provide the corpus for rewriting and polishing the answer text, so that the outputted reply text has more shopping guide art of speaking, which stimulate the user's desire to make purchases.

In an actual implementation, step S002 may be implemented through the following steps:

Step S021: Respectively encode the training answer knowledge path and the training external knowledge path by using a first encoding module to obtain a training answer knowledge vector and a training external knowledge vector, and encode the standard reply text by using a second encoding module to obtain a standard reply vector.

The first encoding module and the second encoding module may be the same type of encoding modules, for example, both are LSTM models, but parameters of the first encoding module and the second encoding module are different.

When step S021 is implemented, the first encoding module may be used to perform forward encoding and backward encoding on the training answer knowledge path respectively, and correspondingly, an answer forward semantic word vector and an answer backward semantic word vector are obtained. Further, the answer forward semantic word vector and the answer backward semantic word vector are spliced to obtain the training answer knowledge vector. The first encoding module respectively performs forward encoding and backward encoding on each training external knowledge path, and correspondingly, an external forward semantic word vector and an external backward semantic word vector are obtained. Further, the external forward semantic word vector and the external backward semantic word vector are spliced to obtain the training external knowledge vector.

The second encoding module respectively performs forward encoding and backward encoding on the standard reply text, obtains a reply forward semantic word vector and a reply backward semantic word vector correspondingly, and splices the reply forward semantic word vector and the reply backward semantic word vector to obtain the standard reply vector.

Step S022: Determine a first initialized vector of a decoder based on the standard reply vector, the training answer knowledge vector, and the training external knowledge vector.

Step S022 may be implemented through the following steps:

Step S0221: Respectively determine first probability distribution parameters of the standard reply vector and the training answer knowledge vector on the training external knowledge vectors.

In step S0221, the first probability distribution function of the combined vector of the standard reply vector and the training knowledge answer vector on each training external knowledge vector is determined, and based on the first probability distribution parameter, a conditional probability distribution of the standard reply text on each training external knowledge path may be determined.

Step S0222: Respectively adjust the training external knowledge vectors based on the first probability distribution parameters to obtain adjusted training external knowledge vectors.

When step S0222 is implemented, each first probability distribution parameter may be used as a weight value, and is multiplied with each corresponding training external knowledge vector to obtain each adjusted training external knowledge vector.

Step S0223: Determine the first initialized vector based on the adjusted training external knowledge vectors.

When Step S0223 is implemented, average pooling processing may be performed on each adjusted training external knowledge vector, thereby obtaining the first initialized vector. The initialized vector is used to initialize the decoder, so that an external knowledge path determined based on the attention mechanism can be introduced in the answer knowledge path.

Step S023: Decode the training answer knowledge vector and the training external knowledge vector by using the decoder based on the first initialized vector, to obtain the training reply text.

When step S023 is implemented, the first initialized vector is used to initialize the state of the decoder, and then the decoder is used to decode the training answer knowledge vector and the external knowledge vector word by word, thereby obtaining the training reply text. In some embodiments, the first initialized vector, the training answer knowledge vector, and the training external knowledge vector may alternatively be inputted to the decoder to perform word-by-word decoding, thereby obtaining the training reply text.

Figure 4:
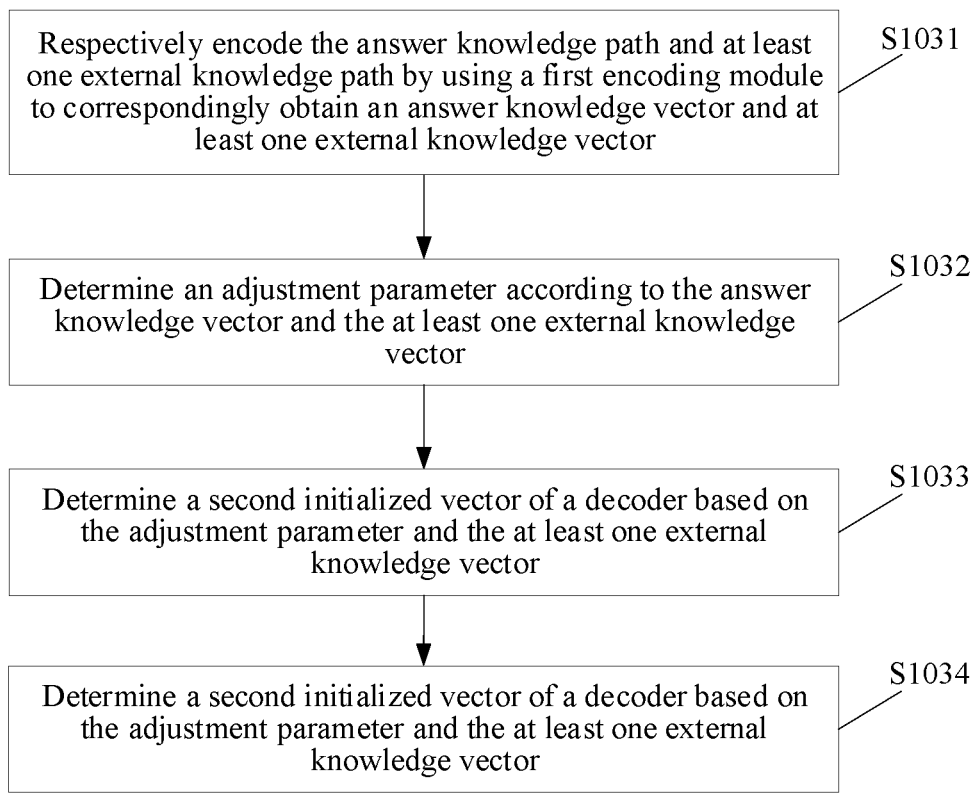
FIG. 4 is a schematic flowchart of obtaining a reply text by using a trained neural network model according to certain embodiment(s) of the present disclosure.

In some embodiments, step S103 "the first terminal inputs the answer knowledge path and the external knowledge path into a trained neural network model to obtain a reply text" may be implemented through step S1031 to step S1034 shown in FIG. 4, and the steps are described below with reference to FIG. 4.

Step S1031: Respectively encode the answer knowledge path and at least one external knowledge path by using a first encoding module to correspondingly obtain an answer knowledge vector and at least one external knowledge vector.

When step S1031 is implemented, the first encoding module is used to respectively perform forward encoding and backward encoding on the answer knowledge path, and splice results of the two encoding processes to obtain the answer knowledge vector. The first encoding module is used to sequentially perform forward encoding and backward encoding on each external knowledge path, and splice results of the two encoding processes to obtain each external knowledge vector.

Step S1032: Determine an adjustment parameter according to the answer knowledge vector and the at least one external knowledge vector.

When step S1032 is implemented, second probability distribution parameters of the answer knowledge vector on training external knowledge vectors may be determined first; and the second probability distribution parameters are then sampled by using a variational idea to obtain the adjustment parameter.

When the trained neural network is used to predict the reply text, the reply text cannot be obtained in advance. Therefore, the adjustment parameter for adjusting the external knowledge vector cannot be determined based on the vector corresponding to the reply text. In addition, when the neural network model is trained, the first loss function is used to constrain the first probability parameter (that is, the adjustment parameter) to be close to the second probability parameter. Therefore, when the adjustment parameter cannot be directly determined, the variational idea may be used to sample the second probability parameter while the second probability parameter is determined, to determine the adjustment parameter.

Step S1033: Determine a second initialized vector of a decoder based on the adjustment parameter and the at least one external knowledge vector.

Step S1034: Decode the answer knowledge vector and the at least one external knowledge vector by using the decoder based on the second initialized vector, to obtain the reply text.

When step S1034 is implemented, the second initialized vector may be first inputted to the decoder to initialize the decoder, and then the initialized decoder is used to decode the answer knowledge vector and at least one external knowledge vector word by word to obtain the reply text.

In the embodiment of steps S1031 to S1034, after the second probability parameter of the conditional probability distribution of the answer knowledge path on each external knowledge path is determined by using the known answer knowledge vector and the external knowledge vector, the variational idea is used to determine the first probability parameter of the conditional probability distribution of the reply text on each external knowledge path, that is, the adjustment parameter. Further, an initialized state vector of the decoder can be determined based on the adjustment parameter and the external knowledge vector. The initialized decoder is then used to decode the answer knowledge vector and the external knowledge vector word by word, to obtain the reply text with shopping guide art of speaking after rewriting and polishing the answer knowledge path by using the external knowledge path.

Figure 5:
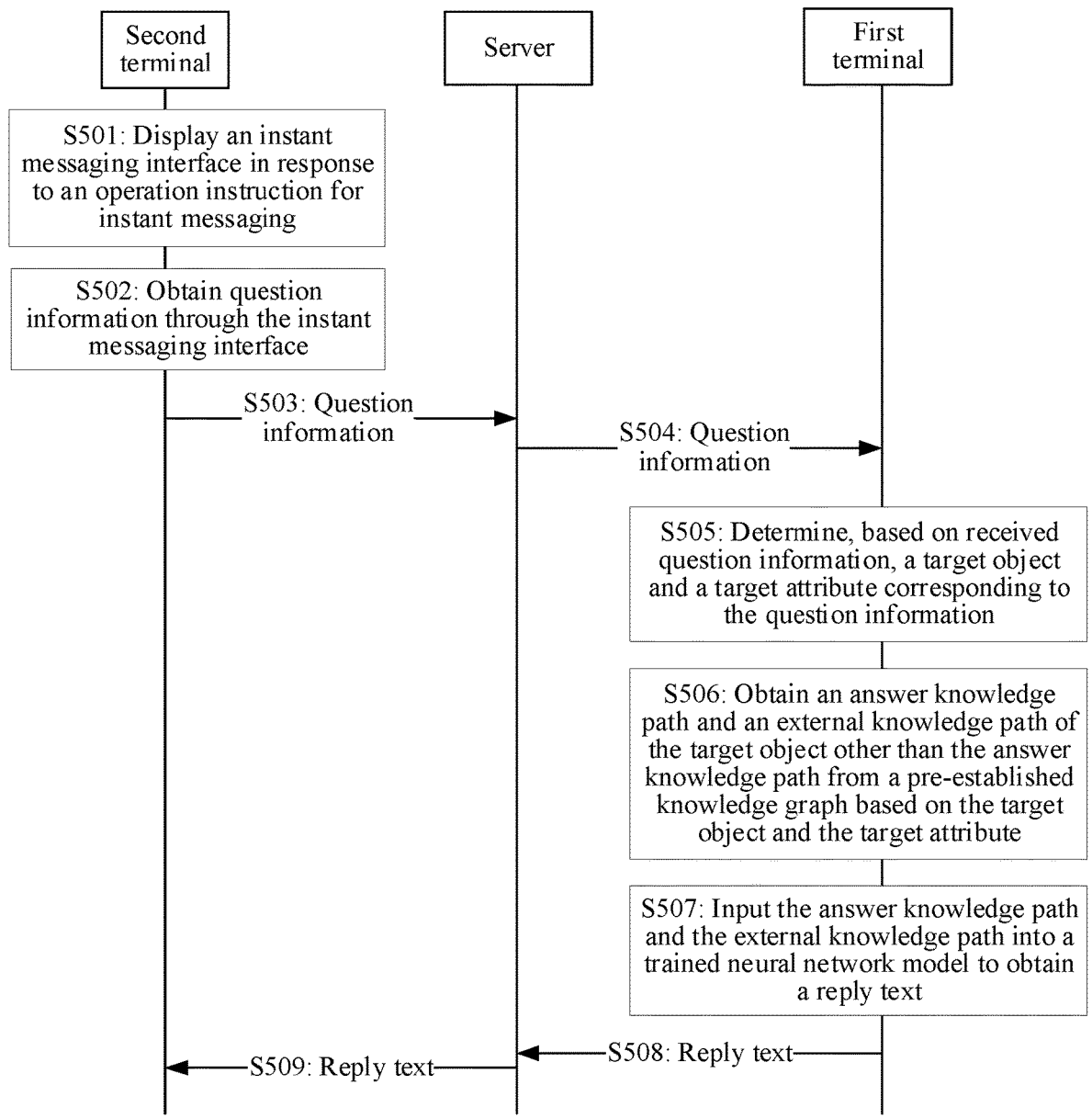
FIG. 5 is a schematic flowchart of an intelligent question answering method according to certain embodiment(s) of the present disclosure.

Based on the embodiments, an embodiment of the present disclosure further provides an intelligent question answering method, applied to the network architecture shown in FIG. 1C. FIG. 5 is a schematic flowchart of another implementation of an intelligent question answering method according to an embodiment of the present disclosure. As shown in FIG. 5, the method includes:

Step S501: A second terminal displays an instant messaging interface in response to an operation instruction for instant messaging.

The second terminal may be a terminal device such as a smartphone, a tablet computer, a notebook computer, or a desktop computer. A variety of apps may be installed on the second terminal, such as shopping apps, video watching apps, music apps, and instant messaging apps. In addition to chatting, making voice calls, and making video calls with friends through the instant messaging app, a user may further use the instant messaging function in the shopping app to conduct online consultation and communication with sellers or other buyer friends.

The method in the embodiments of the present disclosure is applied to online shopping scenarios. Generally, in a commodity details interface, a button control for online communication between a buyer and a seller is provided. When the user clicks or touches the button control, it is considered that an operation instruction for instant messaging is received, thereby displaying the instant messaging interface. In an actual implementation, commodity links may be provided in the display interface.

Step S502: The second terminal obtains question information through the instant messaging interface.

The user may input the question information in a text form or a voice form through the instant messaging interface.

Step S503: The second terminal sends the question information to the server in response to an operation instruction for sending a message.

Step S504: The server sends the question information to the first terminal.

Step S505: The first terminal determines, based on received question information, a target object and a target attribute corresponding to the question information.

The first terminal may be a smart terminal, and an app capable of dialog and chat may be installed on the smart terminal. The app may be an instant messaging app dedicated to dialog and chat, or a shopping app, video app, or the like that provide dialog and chat functions. The chat app installed in the first terminal also has an intelligent automatic reply function. The first terminal may alternatively be an intelligent chat robot capable of automatic reply.

Step S506: The first terminal obtains an answer knowledge path and an external knowledge path of the target object other than the answer knowledge path from a pre-established knowledge graph based on the target object and the target attribute.

The answer knowledge path includes target context information for describing the target attribute, and the external knowledge path includes external context information for describing another attribute.

Step S507: The first terminal inputs the answer knowledge path and the external knowledge path into a trained neural network model to obtain a reply text.

A training corpus of the neural network model during training includes at least comment information of the target object.

Step S508: The first terminal sends the reply text to the server.

Step S509: The server sends the reply text to the second terminal.

In the intelligent question answering method provided in the embodiments of the present disclosure, when a user may communicate with a seller while browsing goods on a shopping app or an e-commerce webpage, question information in the text or the voice form may be sent to the first terminal through the server. The first terminal may be a seller terminal. A trained neural network model is stored in the first terminal, so that the neural network model may be used to determine a reply text for the question information of the user, and the reply text may be sent to the second terminal through the server. Since the first terminal is a customer service robot with the automatic reply function, or an app with the automatic reply function, the automatic reply of intelligent customer service may be realized. When the neural network model is trained, the standard reply text obtained through the comment information is used, thereby ensuring that the reply text not only includes the answer to the question, but also some other commodity information. Therefore, the reply text can be closer to the reply of human customer service, and the automatic reply has the effect of shopping guide art of speaking, which stimulates the user's desire make purchases.

The following describes an exemplary application of this embodiment of the present disclosure in an actual application scenario.

In this embodiment of the present disclosure, relevant sentences are extracted from commodity comments as the training corpus for answer generation, and the answer path and the context information of the knowledge graph are used to rewrite the reply. Therefore, in the answer generation process, the descriptive context information and the answer path are both considered. In addition to answering questions of the user, external knowledge commodity comments as generated answers also describe other attributes of the commodity to stimulate users' desire to make purchases.

When the training corpus is generated, a detailed page of a commodity may be entered through the e-commerce platform. In the commodity details page, a "cumulative comments" tab is clicked to display comment information as shown in FIG. 6. An "impressions" tab 601 in FIG. 6 is clicked to select comments that match some descriptions in the comments. For example, in "overall good", some people comment that "the quality is also very good" and "the workmanship is fine, and it is high-grade".

Figure 7:
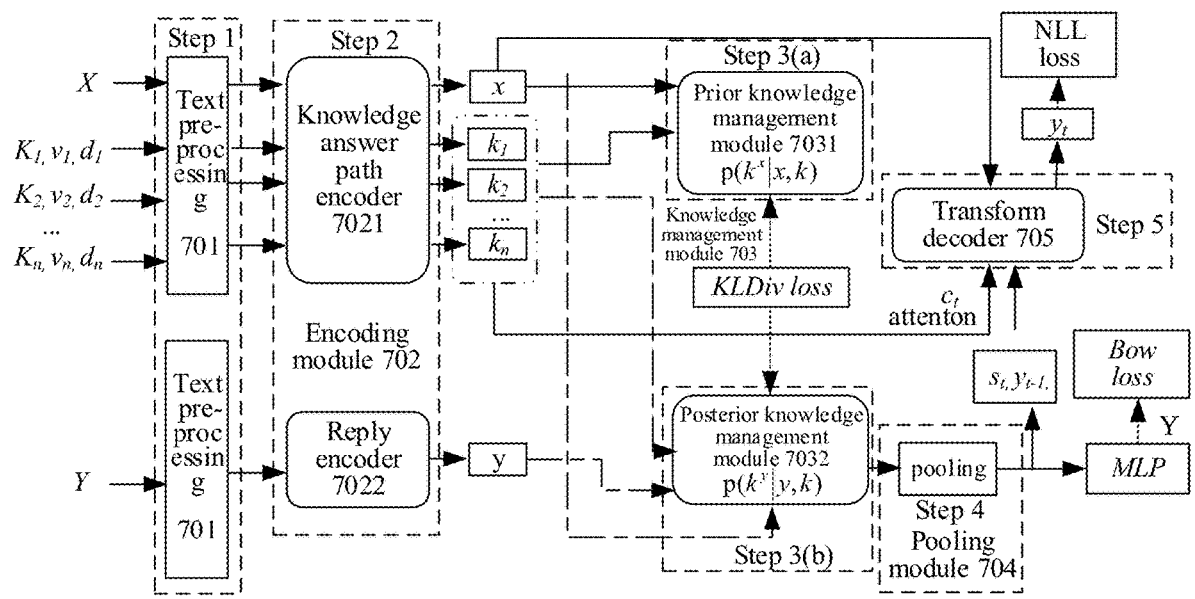
FIG. 7 is a schematic framework diagram of a network model for intelligent question answering according to certain embodiment(s) of the present disclosure.

FIG. 7 is a schematic framework diagram of a network model for intelligent question answering according to an embodiment of the present disclosure. Through the network model, an algorithm flow, a training stage (using obtained data training parameters), and an application stage (providing a trained model to online services) are implemented. The implementation stages are described below with reference to FIG. 7.

1. Algorithm Flow

An algorithm module is based on an encoder-decoder structure. As shown in FIG. 7, the algorithm module includes a text pre-processing module 701, an encoding module 702, a knowledge management module 703, a pooling module 704, and a decoder 705 in FIG. 7, where: the text pre-processing module 701 is configured to process paths, context information, and special symbols in a reply text, conduct English upper-lower case conversion, and unify traditional and simplified fonts; the encoding module 702 is configured to represent a text obtained by the text pre-processing module 701 into a vector; the knowledge management module 703 is configured to use information Y to make $p(k'|k_i,x)$ and $p(k'|k_i,y)$ as similar as possible, so that desired information may be obtained directly from $p(k'|k_i,x)$ during testing, where k' is a new representation of ki obtained by fusing information in an x vector or a y vector in ki; the pooling module 704 is configured to map n pieces of information outputted by the encoding part to one vector representation; and the decoder 705 is configured to generate perfect question replies.

(1) Text pre-processing module 701.

The e-commerce knowledge graph still stores commodities in the form of triples. In this embodiment of the present disclosure, the answer path and the context information are spliced, which is referred to as a "knowledge path" and is represented by $(K_1,v_1,d_1)$. Assuming that for a question inputted by the user, it is queried from the e-commerce knowledge graph through some operations that an answer to the question is a knowledge answer path X. In this implementation, the input of the text pre-processing module 701 is the knowledge answer path X, another knowledge answer path of the commodity other than X, and a standard answer Y extracted from comments.

For example, the input of the text pre-processing module 701 includes:

X: dress, color, red, popular color/enthusiasm;

K1, v1, d1: collar shape, V-neck, showing small face, and temperament;

K2, v2, d2: material, cotton, comfortable; and

Y: It is the popular red this year, the quality of this cotton is very good, and it is very comfortable, \(^o^)/~ and cost-effective.

Since there are emoticons "\(^o^)/~" in the standard answer text Y, the output obtained by the text pre-processing module 701 is:

X: dress, color, red, popular color/enthusiasm;

K1, v1, d1: collar shape, V-neck, showing small face, and temperament;

K2, v2, d2: material, cotton, comfortable; and

Y: It is the popular red this year, the quality of this cotton is very good, and it is very comfortable and cost-effective.

(2) Encoder 702

Although the current pre-training model BERT has a good performance in short text representation, due to the high parameters of the BERT model, the training takes a long time and the efficiency is low. Therefore, in this embodiment of the present disclosure, a bidirectional LSTM model is used to perform encoding on the text.

As shown in FIG. 7, the encoder 702 includes two sub-modules: a knowledge path encoding module 7021 and a reply encoding module 7022 (that is, encoding the standard answer Y). The knowledge path encoding module 7021 encodes the knowledge path representation, and the reply encoding module 7022 encodes the standard answer Y. Both encoders are based on the bidirectional LSTM model, but the two encoders do not share parameters.

(a) Knowledge Path Encoding Module 7021

In this embodiment of the present disclosure, it is defined that the knowledge path encoding module uses LSTM1 as the encoder, and the pre-processed text $(K_i,v_i,d_i)$ is forward-encoded and backward-encoded according to formula (2-1), to obtain the entire sentence representation vector $k_i$:

$$k_i = \left(LST\vec{M}_1 f(K_i, v_i, d_i), LST\overleftarrow{M}_1 f(K_i, v_i, d_i)\right); \quad (2\text{-}1)$$

where a function f represents a pre-processing function, $LST\vec{M}$ represents a forward LSTM encoder, $LST\overleftarrow{M}_1$ backward encoder, and results obtained by the two encoders are spliced as the representation $k_i$ of $(K_i,v_i,d_i)$. The encoding manner of the pre-processed text X is the same as $(K_i,v_i,d_i)$.

(b) Reply Encoder Module 7022

The knowledge answer path is a subgraph structure in the knowledge graph, and Y is a natural language sentence of the reply. The structures of the two are not in the same space, so that the two are not suitable to be encoded by using the same encoder. LSTM2 is defined as the encoder for answer reply, and a reply text Y is encoded according to formula (2-2) to obtain a vector representation y of the reply text:

$$y = \left(LST\vec{M}_2 f(Y), LST\overleftarrow{M}_2 f(Y)\right). \quad (2\text{-}2)$$

For example, the output of the text pre-processing module 701 is:

X: dress, color, red, popular color/enthusiasm;

K1, v1, d1: collar shape, V-neck, showing small face, and temperament;

K2, v2, d2: material, cotton, comfortable; and

Y: It is the popular red this year, the quality of this cotton is very good, and it is very comfortable and cost-effective.

The output obtained by the encoder 702 is (assuming that the encoding dimension is 6 dimensions):

x: [0.123, 0.341, −0.43, 0.234, 0.71, −0.981]

$k_1$: [0.43, −0.51, 0.256, −0.142, 0.198, −0.021]

$k_2$: [0.91, 0.231, −0.330, 0.130, −0.349, −0.471]

y: [0.21, −0.34, −0.130, 0.151, −0.71, 0.712]

(3) Knowledge Management Module 703

In the shopping guide process, in addition to answering questions of the user, it may be desirable to introduce the user to other information about the commodity (that is, the extra points in the knowledge base, that is, the attribute path). Therefore, the known answer may be used to find other knowledge similar to the answer to assist in the generation of shopping guide art of speaking. However, during actual shopping guide, there may be some paths that are quite different from the answer but similar to the answer Y of the shopping guide art of speaking. As a result, it is not enough to rely on prior knowledge during the training, and posterior knowledge also may be relied on. Therefore, the knowledge management module 703 further includes a prior knowledge management module 7031 and a posterior knowledge management module 7032.

In the prior knowledge management module 7031, according to the variational encoder idea it is assumed that $p(k'=k_i^x|x,k_i)$ obeys a normal distribution $N(\mu_i,\sigma_i)$. In formula (3-1), parameters of the conditional probability distribution on different external knowledge paths based on the input X are defined:

$$\begin{bmatrix} \mu_i^x \\ \sigma_i^x \end{bmatrix} = W_x \begin{bmatrix} x \\ k_i \end{bmatrix} + b_x; \quad (3\text{-}1)$$

where $W_x$ and $b_x$ represent parameters of the forward neural network. After calculation, parameters of the normal distribution may be obtained. After the parameter distribution is obtained, a reparameterization method is used to obtain a new representation $k_i^x$ of $k_i$, that is, k'.

In the posterior knowledge management module 7032, it is assumed that $p(k'=k_i^y|y,k_i)$ obeys a normal distribution $N(\mu_i^y,\sigma_i^y)$. In formula (3-2), parameters of the conditional probability distribution on different external knowledge paths based on Y are defined:

$$\begin{bmatrix} \mu_i^y \\ \sigma_i^y \end{bmatrix} = W_y \begin{bmatrix} y \\ k_i \end{bmatrix} + b_y; \quad (3\text{-}2)$$

Since the posterior information cannot be obtained in the testing stage, KL divergence is used in the training stage to constrain the two distributions to be as similar as possible, and the distribution information is then obtained from prior sampling in the testing stage.

The addition of this step uses the information of Y to incorporate more answer paths related to Y. However, the problem is that there is no way to obtain the information of Y in the testing stage. Therefore, during actual implementation, a manner mentioned in a variational autoencoder and a conditional variational encoder is adopted: two distributions are constrained to be similar during training, and posterior knowledge is sampled from prior knowledge during testing. It may be simply understood as: during training, the two distributions are constrained to be similar, so that during testing, the prior knowledge is similar to the posterior knowledge.

Based on the example, the input of the knowledge management module 703 is:

x: [0.123, 0.341, −0.43, 0.234, 0.71, −0.981]
$k_1$: [0.43, −0.51, 0.256, −0.142, 0.198, −0.021]
$k_2$: [0.91, 0.231, −0.330, 0.130, −0.349, −0.471]
y: [0.21, −0.34, −0.130, 0.151, −0.71, 0.712]

The output of the prior knowledge management module 7031 is:

$k_1^x$=[0.23, 0.501, 0.652, −0.241, 0.191, −0.021]
$k_2^x$=[0.198, −0.431, −0.430, 0.320, −0.149, −0.21]

The output of the posterior knowledge management module 7032 is:

$k_1^y$=[−0.23, 0.41, 0.26, −0.412, −0.168, 0.101]
$k_2^y$=[0.53, −0.151, −0.231, −0.142, 0.138, −0.241]

(4) Pooling Module 704

After the knowledge management module 703, representations of the n answer paths of $k_1^y$ to $k_n^y$ are obtained. According to formula (3-3), the n answer paths are expressed through a layer of average pooling operation to obtain an initialized states $S_0$ of the decoder:

$$s_0 = \frac{1}{n}\sum_{i=1}^{n} k_i^y. \quad (3\text{-}3)$$

Based on the example, the input of the pooling module 704 is:

$k_1^y$: [−0.23, 0.41, 0.26, −0.412, −0.168, 0.101]
$k_2^y$: [0.53, −0.151, −0.231, −0.142, 0.138, −0.241]

According to formula (3-3), the output of the pooling module 704 is obtained, that is, the initialized state $S_0$ of the decoder:

s0=½*($k_1^y$+$k_2^y$)=[0.15, −0.129, −0.014, −0.277, −0.015, −0.07].

(5) Decoder 705

In the decoding stage, the decoder 705 incorporates the standard answer and related knowledge paths, and generates a reply word by word. In shopping guide art of speaking, standard path-related answers may be generated first, and answers related to additional knowledge further may be generated. Therefore, at each step of decoding, the two aspects of information may be considered and balanced. A hierarchical gated fusion unit (HGFU) structure is used, and a process of calculating a hidden layer for each decoding may be expressed by formula (3-4):

$$s_t = r \odot s_t^y + (1-r) \odot s_t^k, \quad (3\text{-}4)$$

where $S_t^y$=LSTM($y_{t-1}$, $S_{t-1}$, $c_t$), $S_t^k$=LSTM(x, $S_{t-1}$, $c_t$), and $c_t$ represent context information obtained by the target end to the source end external knowledge through the attention mechanism.

After being obtained, the hidden layer representation passes through a layer of feedforward neural network and a layer of softmax on the vocabulary, to generate a reply word by word.

Based on the example, the input of the decoder 705 is:

$$s0 = 1/2 * (k_1^y + k_2^y) = [0.15, -0.129, -0.014, -0.277, -0.015, -0.07].$$

The output is:

Y: It is the popular red this year, the quality of this cotton is very good, and it is very comfortable and cost-effective.

Training Stage

In the training stage, according to the algorithm flow and the loss function, the network parameters of the model are updated and determined through back propagation to perform the training of the network model. As shown in FIG. 7, the loss function of the network model includes a KL divergence loss function for the knowledge management module, a Bow loss function for the pooling module, and an NLL loss function for the decoder:

the KL divergence loss function is shown in formula (4-1):

$$L_{KL} = \sum_{i=1}^{n} p(k' = k_i^y \mid k_i, y) \log \frac{p(k' = k_i^y \mid k_i, y)}{p(k' = k_i^x \mid k_i, x)}; \quad (4\text{-}1)$$

the Bow loss function is shown in formula (4-2):

$$L_{Bow} = -E_{k_i \sim p(k' = k_i^y \mid k_n, y)} \sum_t \log p(y_t \mid k_i); \quad (4\text{-}2)$$

the NLL loss function is shown in formula (4-3):

$$L_{NLL} = -E_{k_i \sim p(k' = k_i^y \mid k_n, y)} \sum_t \log p(y_t \mid y_{1,\ldots,n}, x, C_t, k_i); \text{ and} \quad (4\text{-}3)$$

the total loss function of the network model is shown in formula (4-4):

$$L_\theta = L_{KL} + L_{Bow} + L_{NLL}. \quad (4\text{-}4)$$

The network model is trained through back propagation to obtain a trained network model.

Application Stage

In the application stage, since there is no posterior knowledge Y, Y is not encoded, and there is no posterior knowledge management model related to Y. When this part is passed to the decoder, a representation is obtained by sampling from P(k'|x, k), and the representation then passes through the pooling layer and is inputted to the decoder to obtain an answer.

The intelligent question answering method provided in the embodiments of the present disclosure may be applied to a customer service robot. When a user asks a question about an attribute related to a commodity, after an answer path in a knowledge graph is obtained, subgraph information centered on the commodity in the knowledge graph is used, to generate an answer.

Taking a dress as an example, the dress has attributes such as a color (red), a price (98), and a material (cotton). When the user asks "what color is this?", the customer service in the related art generally replies with "red". However, after the network model provided in the embodiments of the present disclosure is adopted, the customer service replies with "it is the popular red this year, the quality of this cotton is very good, and it is very comfortable and cost-effective", which can better stimulate users' desire to make purchases.

This embodiment of the present disclosure is not to find an answer based on a question, but to supplement and rewrite attributes of a reply when the answer is known.

Different from the previous question answering solution based on a general domain knowledge graph, in this embodiment of the present disclosure, for the customer service question answering in the e-commerce scenario, the goal of generating shopping guide art of speaking is provided, and corpora of shopping guide art of speaking are constructed according to a manner of obtaining product comments from other open platforms in the e-commerce scenario. The corpora may be used in a variety of scenarios in the field of e-commerce. In addition, compared to the conventional manner of using knowledge graph triples for question answering, this embodiment of the present disclosure proposes to use external knowledge such as attribute description information to drive the generation of shopping guide art of speaking. Moreover, the question answering based on the knowledge graph is divided into two stages. The input is a known answer path, a standard answer, and a relationship path related to the entity. This manner may ensure the correctness of the answer and the diversity of the reply.

An exemplary structure of an intelligent question answering apparatus 80 provided in the embodiments of the present disclosure as a software module is described below. In some embodiments, as shown in FIG. 2, a software module in the intelligent question answering apparatus 80 stored in a memory 140 may include: a first determining module 81, configured to determine, based on received question information, a target object and a target attribute corresponding to the question information; a first obtaining module 82, configured to obtain an answer knowledge path and an external knowledge path of the target object other than the answer knowledge path from a pre-established knowledge graph based on the target object and the target attribute, the answer knowledge path including target context information for describing the target attribute, and the external knowledge path including external context information for describing another attribute; a prediction processing module 83, configured to input the answer knowledge path and the external knowledge path into a trained neural network model to obtain a reply text, a training corpus of the neural network model during training including at least comment information of the target object; and an output module 84, configured to output the reply text.

In some embodiments, the first obtaining module 82 is further configured to: obtain an answer path and another path of the target object other than the answer path from the knowledge graph based on the target object and the target attribute, the answer path including the target attribute of the target object and a target attribute value, and the another path including the another attribute of the target object and another attribute value; obtain the target context information corresponding to the answer path, and determine the answer knowledge path based on the answer path and the target context information corresponding to the answer path; and obtain the external context information corresponding to the another path, and determine the external knowledge path based on the another path and the external context information corresponding to the another path.

In some embodiments, the apparatus further includes: a second obtaining module, configured to obtain training data, the training data including a training answer knowledge path, a training external knowledge path, and a standard reply text; an input module, configured to input the training answer knowledge path, the training external knowledge path, and the standard reply text into the neural network model to obtain a training reply text; and a training module, configured to perform back propagation training on the neural network model by using the standard reply text and the training reply text, to adjust a parameter of the neural network model.

In some embodiments, the input module is further configured to: respectively encode the training answer knowledge path and the training external knowledge path by using a first encoding module to obtain a training answer knowledge vector and a training external knowledge vector, and encode the standard reply text by using a second encoding module to obtain a standard reply vector; determine a first initialized vector of a decoder based on the standard reply vector, the training answer knowledge vector, and the training external knowledge vector; and decode the training answer knowledge vector and the training external knowledge vector by using the decoder based on the first initialized vector, to obtain the training reply text.

In some embodiments, the input module is further configured to: respectively determine first probability distribution parameters of the standard reply vector and the training answer knowledge vector on the training external knowledge vectors; respectively adjust the training external knowledge vectors based on the first probability distribution parameters to obtain adjusted training external knowledge vectors; and determine the first initialized vector based on the adjusted training external knowledge vectors.

In some embodiments, the training module is further configured to: transmit a difference value between the standard reply text and the training reply text back to the neural network model, and jointly train the neural network model by using a first loss function, a second loss function, a third loss function, to adjust the parameter of the neural network model.

In some embodiments, the prediction processing module is further configured to: respectively encode the answer knowledge path and at least one external knowledge path by using a first encoding module to obtain an answer knowledge vector and at least one external knowledge vector; determine an adjustment parameter according to the answer knowledge vector and the at least one external knowledge vector; determine a second initialized vector of a decoder based on the adjustment parameter and the at least one external knowledge vector; and decode the answer knowledge vector and the at least one external knowledge vector by using the decoder based on the second initialized vector, to obtain the reply text.

In some embodiments, the prediction processing module is further configured to: determine second probability distribution parameters of the answer knowledge vector on training external knowledge vectors; and sample the second probability distribution parameters by using a variational idea to obtain the adjustment parameter.

In some embodiments, the apparatus further includes: a third obtaining module, configured to obtain the comment information of the target object and an attribute value of each attribute; a second determining module, configured to determine target comment information corresponding to each attribute from the comment information based on the each attribute value; and a pre-processing module, configured to pre-process the target comment information to obtain the standard reply text corresponding to the each attribute.

The description of the embodiments of the intelligent question answering apparatus is similar to the description of the method embodiments, and has beneficial effects the same as those of the method embodiments. For the technical details not disclosed in the embodiments of the intelligent question answering apparatus, a person skilled in the art refers to the description of the method embodiments of the present disclosure for understanding.

An embodiment of the present disclosure provides a computer program product or a computer program. The computer program product or the computer program includes computer instructions, and the computer instructions are stored in a computer-readable storage medium. A processor of a computing device reads the computer instructions from the computer-readable storage medium, and executes the computer instructions, to cause the computing device to perform the intelligent question answering method according to the embodiments of the present disclosure.

An embodiment of the present disclosure provides a storage medium storing executable instructions. The executable instructions, when executed by a processor, causing the processor to perform the method provided in the embodiments of the present disclosure, for example, the method shown in FIG. 3, FIG. 4, and FIG. 5.

In some embodiments, the storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a CD-ROM; or may be any device including one of or any combination of the memories.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In some embodiments, the executable instructions may be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may correspond to a file in a file system, and may be stored in a part of a file that saves another program or other data, for example, be stored in one or more scripts in a HyperText Markup Language (HTML) file, stored in a file that is specially used for a program in discussion, or stored in the plurality of collaborative files (for example, be stored in files of one or modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

The descriptions are merely embodiments of the present disclosure and are not intended to limit the protection scope of the present disclosure. Any modification, equivalent replacement, or improvement made without departing from the spirit and range of the present disclosure shall fall within the protection scope of the present disclosure.

What is claimed is:

1. An intelligent question answering method, applied to a computing device, the method comprising:
 displaying a graphical messaging interface of an application program installed on the computing device;
 determining, based on question information received from the graphical messaging interface, a target object and a target attribute corresponding to the question information;

obtaining an answer knowledge path and an external knowledge path of the target object other than the answer knowledge path from a knowledge graph based on the target object and the target attribute, the answer knowledge path including target context information for describing the target attribute, and the external knowledge path including external context information for describing another attribute;

inputting the answer knowledge path and the external knowledge path into a neural network model to obtain a reply text, a training corpus of the neural network model during training including at least comment information of the target object; and presenting the reply text in the graphical messaging interface so as to stimulate user desire to make purchases, wherein the neural network model is trained by:

obtaining comment information of the target object and an attribute value of each attribute;

determining target comment information corresponding to each attribute from the comment information based on the each attribute value;

processing the target comment information to obtain a standard reply text corresponding to the each attribute;

obtaining training data, the training data including a training answer knowledge path, a training external knowledge path, and the standard reply text;

inputting the training answer knowledge path, the training external knowledge path, and the standard reply text into the neural network model to obtain a training reply text; and performing back propagation training on the neural network model by using the standard reply text and the training reply text, to adjust a parameter of the neural network model.

2. The method according to claim 1, wherein obtaining the answer knowledge path and the external knowledge path comprises:

obtaining an answer path and another path of the target object other than the answer path from the knowledge graph based on the target object and the target attribute, the answer path including the target attribute of the target object and a target attribute value, and the another path including the another attribute of the target object and another attribute value;

obtaining the target context information corresponding to the answer path, and determining the answer knowledge path based on the answer path and the target context information corresponding to the answer path; and obtaining the external context information corresponding to the another path, and determining the external knowledge path based on the another path and the external context information corresponding to the another path.

3. The method according to claim 1, wherein inputting the training answer knowledge path, the training external knowledge path, and the standard reply text into the neural network model comprises:

encoding the training answer knowledge path by using a first encoding module to obtain a training answer knowledge vector, and encoding the training external knowledge path by using the first encoding module to obtain a training external knowledge vector;

encoding the standard reply text by using a second encoding module to obtain a standard reply vector;

determining a first initialized vector of a decoder based on the standard reply vector, the training answer knowledge vector, and the training external knowledge vector; and decoding the training answer knowledge vector and the training external knowledge vector by using the decoder based on the first initialized vector, to obtain the training reply text.

4. The method according to claim 3, wherein determining the first initialized vector comprises:

determining first probability distribution parameters of the standard reply vector and the training answer knowledge vector on the training external knowledge vectors;

adjusting the training external knowledge vectors based on the first probability distribution parameters to obtain adjusted training external knowledge vectors; and determining the first initialized vector based on the adjusted training external knowledge vectors.

5. The method according to claim 1, wherein performing the back propagation training on the neural network model comprises:

transmitting a difference value between the standard reply text and the training reply text back to the neural network model, and jointly training the neural network model by using a first loss function, a second loss function, a third loss function, to adjust the parameter of the neural network model.

6. The method according to claim 1, wherein inputting the answer knowledge path and the external knowledge path into the neural network model comprises:

encoding the answer knowledge path by using a first encoding module to obtain an answer knowledge vector, and encoding at least one external knowledge path by using the first encoding module to obtain at least one external knowledge vector;

determining an adjustment parameter according to the answer knowledge vector and the at least one external knowledge vector;

determining a second initialized vector of a decoder based on the adjustment parameter and the at least one external knowledge vector; and decoding the answer knowledge vector and the at least one external knowledge vector by using the decoder based on the second initialized vector, to obtain the reply text.

7. The method according to claim 6, wherein determining the adjustment parameter comprises:

determining second probability distribution parameters of the answer knowledge vector on training external knowledge vectors; and sampling the second probability distribution parameters by using a variational idea to obtain the adjustment parameter.

8. The method according to claim 1, wherein:

the application program is one of a video watching application, a shopping application, a music application, and an instant messaging application.

9. The method according to claim 1, wherein presenting the reply text in the graphical messaging interface comprises:

presenting a link to an item in the graphical messaging interface.

10. An intelligent question answering apparatus, comprising: a memory storing computer program instructions; and a processor coupled to the memory and configured to execute the computer program instructions and perform:

displaying a graphical messaging interface of an application program installed on the intelligent question answering apparatus;

determining, based on question information received from the graphical messaging interface, a target object and a target attribute corresponding to the question information;

obtaining an answer knowledge path and an external knowledge path of the target object other than the answer knowledge path from a knowledge graph based on the target object and the target attribute, the answer knowledge path including target context information for describing the target attribute, and the external knowledge path including external context information for describing another attribute;

inputting the answer knowledge path and the external knowledge path into a neural network model to obtain a reply text, a training corpus of the neural network model during training including at least comment information of the target object; and presenting the reply text in the graphical messaging interface so as to stimulate user desire to make purchases, wherein the neural network model is trained by:
    obtaining comment information of the target object and an attribute value of each attribute;
    determining target comment information corresponding to each attribute from the comment information based on the each attribute value;
    processing the target comment information to obtain a standard reply text corresponding to the each attribute;
    obtaining training data, the training data including a training answer knowledge path, a training external knowledge path, and the standard reply text;
    inputting the training answer knowledge path, the training external knowledge path, and the standard reply text into the neural network model to obtain a training reply text; and
    performing back propagation training on the neural network model by using the standard reply text and the training reply text, to adjust a parameter of the neural network model.

11. The intelligent question answering apparatus according to claim 10, wherein obtaining the answer knowledge path and the external knowledge path includes:
    obtaining an answer path and another path of the target object other than the answer path from the knowledge graph based on the target object and the target attribute, the answer path including the target attribute of the target object and a target attribute value, and the another path including the another attribute of the target object and another attribute value;
    obtaining the target context information corresponding to the answer path, and determining the answer knowledge path based on the answer path and the target context information corresponding to the answer path; and
    obtaining the external context information corresponding to the another path, and determining the external knowledge path based on the another path and the external context information corresponding to the another path.

12. The intelligent question answering apparatus according to claim 10, wherein inputting the training answer knowledge path, the training external knowledge path, and the standard reply text into the neural network model includes:
    encoding the training answer knowledge path by using a first encoding module to obtain a training answer knowledge vector, and encoding the training external knowledge path by using the first encoding module to obtain a training external knowledge vector;
    encoding the standard reply text by using a second encoding module to obtain a standard reply vector;
    determining a first initialized vector of a decoder based on the standard reply vector, the training answer knowledge vector, and the training external knowledge vector; and
    decoding the training answer knowledge vector and the training external knowledge vector by using the decoder based on the first initialized vector, to obtain the training reply text.

13. The intelligent question answering apparatus according to claim 12, wherein determining the first initialized vector includes:
    determining first probability distribution parameters of the standard reply vector and the training answer knowledge vector on the training external knowledge vectors;
    adjusting the training external knowledge vectors based on the first probability distribution parameters to obtain adjusted training external knowledge vectors; and
    determining the first initialized vector based on the adjusted training external knowledge vectors.

14. The intelligent question answering apparatus according to claim 10, wherein performing the back propagation training on the neural network model includes:
    transmitting a difference value between the standard reply text and the training reply text back to the neural network model, and jointly training the neural network model by using a first loss function, a second loss function, a third loss function, to adjust the parameter of the neural network model.

15. The intelligent question answering apparatus according to claim 10, wherein inputting the answer knowledge path and the external knowledge path into the neural network model includes:
    encoding the answer knowledge path by using a first encoding module to obtain an answer knowledge vector, and encoding at least one external knowledge path by using the first encoding module to obtain at least one external knowledge vector;
    determining an adjustment parameter according to the answer knowledge vector and the at least one external knowledge vector;
    determining a second initialized vector of a decoder based on the adjustment parameter and the at least one external knowledge vector; and
    decoding the answer knowledge vector and the at least one external knowledge vector by using the decoder based on the second initialized vector, to obtain the reply text.

16. The intelligent question answering apparatus according to claim 15, wherein determining the adjustment parameter includes:
    determining second probability distribution parameters of the answer knowledge vector on training external knowledge vectors; and
    sampling the second probability distribution parameters by using a variational idea to obtain the adjustment parameter.

17. A non-transitory computer-readable storage medium storing computer program instructions executable by at least one processor of a computing device to perform:
- displaying a graphical messaging interface of an application program installed on the computing device;
- determining, based on question information received from the graphical messaging interface, a target object and a target attribute corresponding to the question information;
- obtaining an answer knowledge path and an external knowledge path of the target object other than the answer knowledge path from a knowledge graph based on the target object and the target attribute, the answer knowledge path including target context information for describing the target attribute, and the external knowledge path including external context information for describing another attribute;
- inputting the answer knowledge path and the external knowledge path into a neural network model to obtain a reply text, a training corpus of the neural network model during training including at least comment information of the target object; and
- presenting the reply text in the graphical messaging interface so as to stimulate user desire to make purchases,
- wherein the neural network model is trained by:
  - obtaining comment information of the target object and an attribute value of each attribute;
  - determining target comment information corresponding to each attribute from the comment information based on the each attribute value;
  - processing the target comment information to obtain a standard reply text corresponding to the each attribute;
  - obtaining training data, the training data including a training answer knowledge path, a training external knowledge path, and the standard reply text;
  - inputting the training answer knowledge path, the training external knowledge path, and the standard reply text into the neural network model to obtain a training reply text; and
  - performing back propagation training on the neural network model by using the standard reply text and the training reply text, to adjust a parameter of the neural network model.

18. The non-transitory computer-readable storage medium according to claim 17, wherein obtaining the answer knowledge path and the external knowledge path includes:
- obtaining an answer path and another path of the target object other than the answer path from the knowledge graph based on the target object and the target attribute, the answer path including the target attribute of the target object and a target attribute value, and the another path including the another attribute of the target object and another attribute value;
- obtaining the target context information corresponding to the answer path, and determining the answer knowledge path based on the answer path and the target context information corresponding to the answer path; and
- obtaining the external context information corresponding to the another path, and determining the external knowledge path based on the another path and the external context information corresponding to the another path.

* * * * *